(No Model.)
S. B. SHERER.
TETHER STAKE.
No. 344,683. Patented June 29, 1886.
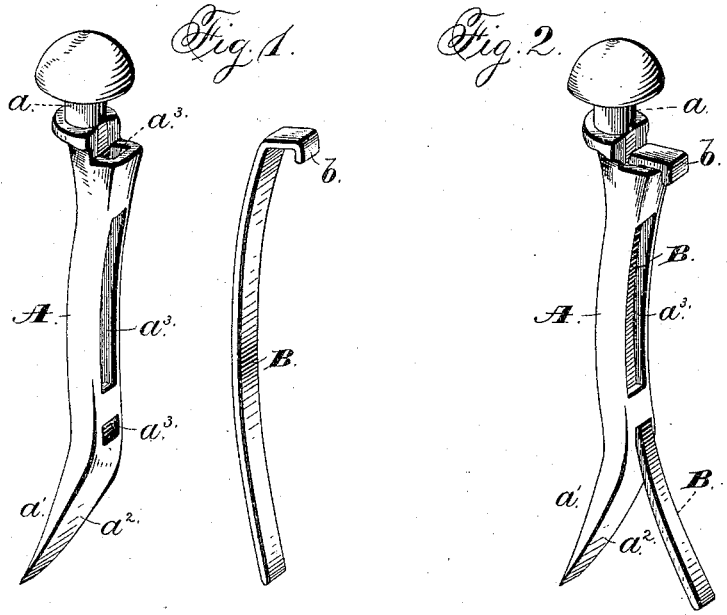
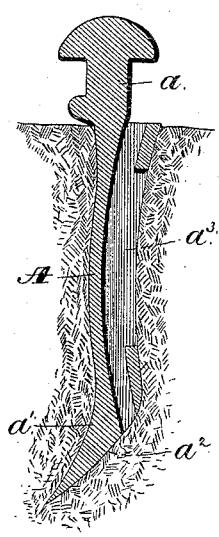
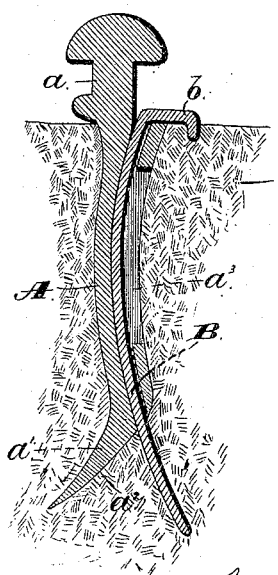
Witnesses:
Jas. E. Hutchinson
Henry C. Hazard
Inventor:
Saml. B. Sherer, by
Prindle & Russell, his Attys.

UNITED STATES PATENT OFFICE.

SAMUEL B. SHERER, OF AURORA, ILLINOIS.

TETHER-STAKE.

SPECIFICATION forming part of Letters Patent No. 344,683, dated June 29, 1886.

Application filed March 4, 1886. Serial No. 193,995. (No model.)

*To all whom it may concern:*

Be it known that I, SAMUEL B. SHERER, of Aurora, in the county of Kane, and in the State of Illinois, have invented certain new and useful Improvements in Tether-Stakes; and I do hereby declare that the following is a full, clear, and exact description thereof, reference being had to the accompanying drawings, in which—
Figure 1 is a perspective view of the parts of my device separated from each other. Fig. 2 is a like view of the same combined. Fig. 3 is a longitudinal section of the main stake or pin in position within the ground, and Fig. 4 is a like view of the same after the locking stake or pin is driven to place.

Letters of like name and kind refer to like parts in each of the figures.

The object of my invention is mainly to furnish a secure fastening for horses and other animals; and to this end said invention consists, principally, in the main stake having its lower end inclined to one side at an angle to the body of the stake, and having a longitudinal way in such body, combined with the supplemental stake passed down through such way and projecting from the main stake at an angle opposite that of the lower end of the latter, substantially as and for the purpose hereinafter shown.

It consists, further, in the main stake provided with a curved longitudinal way and having its lower end projecting at an angle to the side of the stake, combined with the curved supplemental stake in the way in the main stake, having its lower end projecting out from the stake and a shoulder on its upper end adapted to engage the upper end of said way, substantially as and for the purpose hereinafter set forth.

It consists, finally, in a fastening device composed of a main stake which has its lower end pointed and formed on a line oblique to the upper portion, in combination with a supplemental stake passed longitudinally through said main stake and having its lower end projecting at an angle opposite to the angle of the lower end of the main stake, substantially as and for the purpose hereinafter shown and described.

In the carrying of my invention into practice I employ a main stake, A, which has any desired dimensions, and at its upper end is preferably provided with a reduced portion or neck, $a$, to which may be tied a lariat, and at its lower end, $a'$, is pointed, to adapt it to be driven into the ground. From said lower end upward for a short distance said stake is turned outward at an angle to its upper portion, and such oblique part $a^2$ is preferably flattened like a wedge.

Within the side of the stake A, opposite to that from which the oblique part $a^2$ projects, is formed a groove, $a^3$, which extends from or near the neck $a^3$, lengthwise of said stake, to or near the upper end of the oblique part $a^2$, and has, longitudinally, a curved form, its concave side being outward. Said groove may, as is shown in the drawings, be formed entirely within said stake, and may have a portion of its length open, or it may be formed by means of bands or loops passed around and secured to said part.

The groove $a^3$ is preferably rectangular in cross-section, but may, if desired, have a round form, and within the same is loosely fitted a supplemental stake, B, which has a length substantially equal to the length of the stake A from its neck $a$ to its point $a'$, and at its upper end has an outward-projecting head, $b$. Said stake B has a longitudinal curve corresponding to the curvature of said groove, and is adapted to be easily placed in or withdrawn from the same. When in position within said groove, the lower portion of said stake B projects outward at an angle substantially opposite to the angle of the oblique portion $a^2$ of said stake A.

In the use of my device the stake B is withdrawn from the groove of the stake A and the latter driven into the ground until its neck $a$ is at or near the surface of the same, after which said stake B is inserted within its groove and driven downward to place, by which means its lower portion is caused to penetrate the ground at a different angle from the oblique portion $a^2$ of said stake A, and operates to effectually lock the latter in place and to prevent displacement by any force likely to be exerted.

To withdraw the device from the ground, the stake B is first removed and the stake A then drawn outward, each of which operation, is easily and quickly effected.

While intended for use in tethering animals, my device is equally applicable and useful in the fastening of tents, in the guying of derricks, and in all places where a firm ground attachment is desired.

Having thus described my invention, what I claim is—

1. In combination with the main stake having its lower end inclined to one side at an angle to the body of the stake and having a longitudinal way in such body, the supplemental stake passed down through such way and projecting from the main stake at an angle opposite that of the lower end of the latter, substantially as and for the purpose shown.

2. In combination with the main stake provided with a curved longitudinal way and having its lower end projecting at an angle to the side of the stake, the curved supplemental stake in the way in the main stake having its lower end projecting out from the stake and a shoulder on its opposite end adapted to engage the upper end of said way, substantially as and for the purpose set forth.

3. A fastening device composed of a main stake which has its lower end pointed and formed on a line oblique to the upper portion, in combination with a supplemental stake passed longitudinally through said main stake and having its lower end projecting at an angle opposite to the angle of the lower end of the main stake, substantially as and for the purpose shown and described.

In testimony that I claim the foregoing I have hereunto set my hand.

SAMUEL B. SHERER.

Witnesses:
J. M. KENNEDY,
C. M. CHENEY.